(12) United States Patent
Bar-Ness et al.

(10) Patent No.: US 8,625,707 B2
(45) Date of Patent: Jan. 7, 2014

(54) APPARATUS AND METHOD FOR SPACE FREQUENCY BLOCK CODING IN A MULTIPLE INPUT MULTIPLE OUTPUT SINGLE CARRIER WIRELESS COMMUNICATION SYSTEM

(75) Inventors: Yeheskel Bar-Ness, Marlboro, NJ (US); Kodzovi Acolatse, Newark, NJ (US); Tak-Ki Yu, Yongin-si (KR); Yung-Soo Kim, Seongnam-si (KR); Myeon-Kyun Cho, Seongnam-si (KR)

(73) Assignees: Samsung Electronics Co., Ltd., Suwon-si (KR); New Jersey Institute of Technology, Newark, NJ (US)

( * ) Notice: Subject to any disclaimer, the term of this patent is extended or adjusted under 35 U.S.C. 154(b) by 983 days.

(21) Appl. No.: 12/291,960

(22) Filed: Nov. 14, 2008

(65) Prior Publication Data

US 2009/0180572 A1     Jul. 16, 2009

(30) Foreign Application Priority Data

Nov. 16, 2007   (KR) .......................... 10-2007-0117026

(51) Int. Cl.
*H04L 27/00*     (2006.01)
(52) U.S. Cl.
USPC ........................................ 375/295; 375/299
(58) Field of Classification Search
USPC .................................. 375/260–285, 295–315
See application file for complete search history.

(56) References Cited

U.S. PATENT DOCUMENTS

| | | | | |
|---|---|---|---|---|
| 7,342,970 | B2 * | 3/2008 | Liu ................................ | 375/267 |
| 7,386,076 | B2 * | 6/2008 | Onggosanusi et al. ........ | 375/299 |
| 7,729,433 | B2 * | 6/2010 | Jalloul et al. .................. | 375/260 |
| 2005/0063378 | A1 * | 3/2005 | Kadous .......................... | 370/389 |
| 2007/0201408 | A1 * | 8/2007 | Tiirola et al. ................. | 370/335 |
| 2008/0165865 | A1 * | 7/2008 | Bar-Ness et al. ............. | 375/241 |

FOREIGN PATENT DOCUMENTS

| | | |
|---|---|---|
| KR | 10-2001-0107770 | 12/2001 |
| KR | 10-2004-0032730 | 4/2004 |
| KR | 10-2004-0069971 | 8/2004 |
| KR | 10-2006-0128076 | 12/2006 |

\* cited by examiner

*Primary Examiner* — Sam K Ahn
*Assistant Examiner* — Janice Tieu

(57) ABSTRACT

A Multiple Input Multiple Output (MIMO) single carrier wireless communication system is provided. The system includes a coder for performing block coding on symbols, an extender for collecting the block-coded symbols during one transmit (Tx) signal duration and for performing repetitive extension on the collected symbol vectors by an interval required in a frequency domain, an inserter for inserting '0' to the repetitively extended symbol vectors so that the vectors are mutually orthogonal in a time domain, and a combiner for multiplying the '0'-inserted symbol vectors by a phase component so that the vectors are mutually orthogonal in the frequency domain and thereafter for combining the symbol vectors to generate a Tx signal for each antenna.

20 Claims, 3 Drawing Sheets

APPARATUS AND METHOD FOR SPACE FREQUENCY BLOCK CODING IN A MULTIPLE INPUT MULTIPLE OUTPUT SINGLE CARRIER WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Nov. 16, 2007 and assigned Serial No. 10-2007-0117026, the entire disclosure of which is hereby incorporated by reference.

TECHNICAL FIELD OF THE INVENTION

The present invention relates to a Multiple Input Multiple Output (MIMO) single carrier wireless communication system. More particularly, the present invention relates to an apparatus and method for Single Carrier-Space Frequency Block Coding (SC-SFBC) in a MIMO single carrier wireless communication system.

BACKGROUND OF THE INVENTION

Recently, with a growing demand on services using wireless communication systems, there is ongoing active research on a system for ensuring a high data rate in a radio channel. The research on the wireless communication systems focuses on solving problems such as multipath fading, a time varying property of the radio channel, a bandwidth limit, and a power limit of a mobile terminal.

For example, a space-time transmission scheme is one technique for overcoming multipath fading. Orthogonality between received signals needs to be ensured in the use of a space-time transmission scheme. A delay spread of a frequency selective fading channel destroys the orthogonality between the received signals. Therefore, the space-time transmission scheme provides effective performance in a frequency flat block fading channel condition.

In addition, an Orthogonal Frequency Division Multiplexing (OFDM) scheme also shows a characteristic robust to multipath fading. Therefore, space-time OFDM and space-frequency OFDM have been proposed as an effective alternative for overcoming the frequency selective fading. Unlike the space-time OFDM, the space-frequency OFDM can be applied to a fast fading channel in which a channel value does not remain as a constant during at least two transmission blocks.

According to characteristics of the OFDM scheme, one data stream is transmitted through a plurality of subcarriers at a low data rate, thereby generating a high Peak to Average Power Ratio (PAPR). In addition, the OFDM scheme has a problem of performance deterioration due to phase noise and frequency offset. To overcome the problem of the OFDM scheme, a single carrier transmission scheme for performing equalization of a frequency axis has been proposed. The single carrier transmission scheme has a structure and performance similar to those of the OFDM scheme. Advantageously, however, the single carrier transmission scheme is robust to non-linear distortion and subcarrier synchronization distortion, and also has a low PAPR. In addition, when using the single carrier transmission scheme, a transmitter can be implemented in a structure having a significantly low complexity.

To maximize the performance of the single carrier transmission scheme, a system in which the single subcarrier transmission scheme and a Multiple Input Multiple Output (MIMO) scheme are combined is taken into account. Accordingly, there is a need to propose a transmission signal design and a transmitter/receiver structure by which a diversity gain and a multiplex gain can be obtained using the MIMO scheme while maintaining the advantages of the single carrier transmission scheme.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for obtaining a diversity gain and a multiplexing gain in a Multiple Input Multiple Output (MIMO) single carrier wireless communication system.

Another aspect of the present invention is to provide an apparatus and method for performing Space Frequency Block Coding (SFBC) in a MIMO single carrier wireless communication system.

In accordance with an aspect of the present invention, a transmitting end apparatus in a MIMO single carrier wireless communication system is provided. The apparatus includes a coder for performing block coding on symbols, an extender for collecting the block-coded symbols during one transmit (Tx) signal duration and for performing repetitive extension on the collected symbol vectors by an interval required in a frequency domain, an inserter for inserting '0' to the repetitively extended symbol vectors so that the vectors are mutually orthogonal in a time domain, and a combiner for multiplying the '0'-inserted symbol vectors by a phase component so that the vectors are mutually orthogonal in the frequency domain and thereafter for combining the symbol vectors to generate a Tx signal for each antenna.

In accordance with another aspect of the present invention, a method of transmitting a signal of a transmitting end in a MIMO single carrier wireless communication system is provided. The method includes performing block coding on one or more symbols, collecting the block-coded symbols during one Tx signal duration and performing repetitive extension on the collected symbol vectors by an interval required in a frequency domain, inserting '0' to the repetitively extended symbol vectors so that the vectors are mutually orthogonal in a time domain, multiplying the '0'-inserted symbol vectors by a phase component so that the vectors are mutually orthogonal in the frequency domain, and thereafter combining the symbol vectors to generate a Tx signal for each antenna.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

Figure 1:
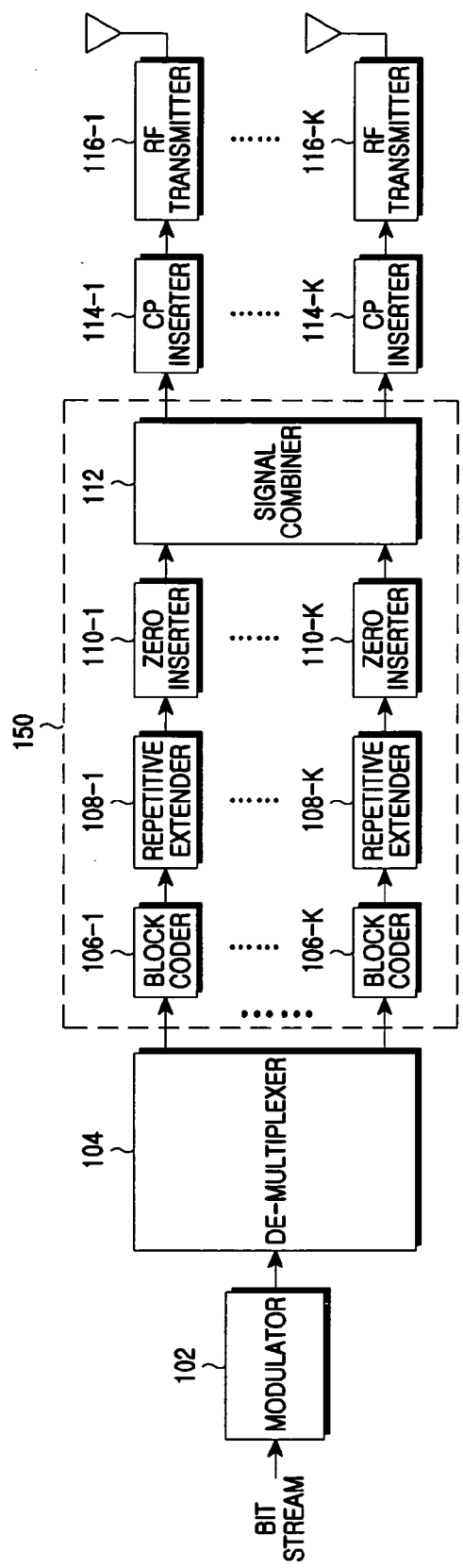
FIG. 1 is a block diagram of a transmitting end in a Multiple Input Multiple Output (MIMO) single carrier wireless communication system according to an exemplary embodiment of the present invention.
Figure 2:
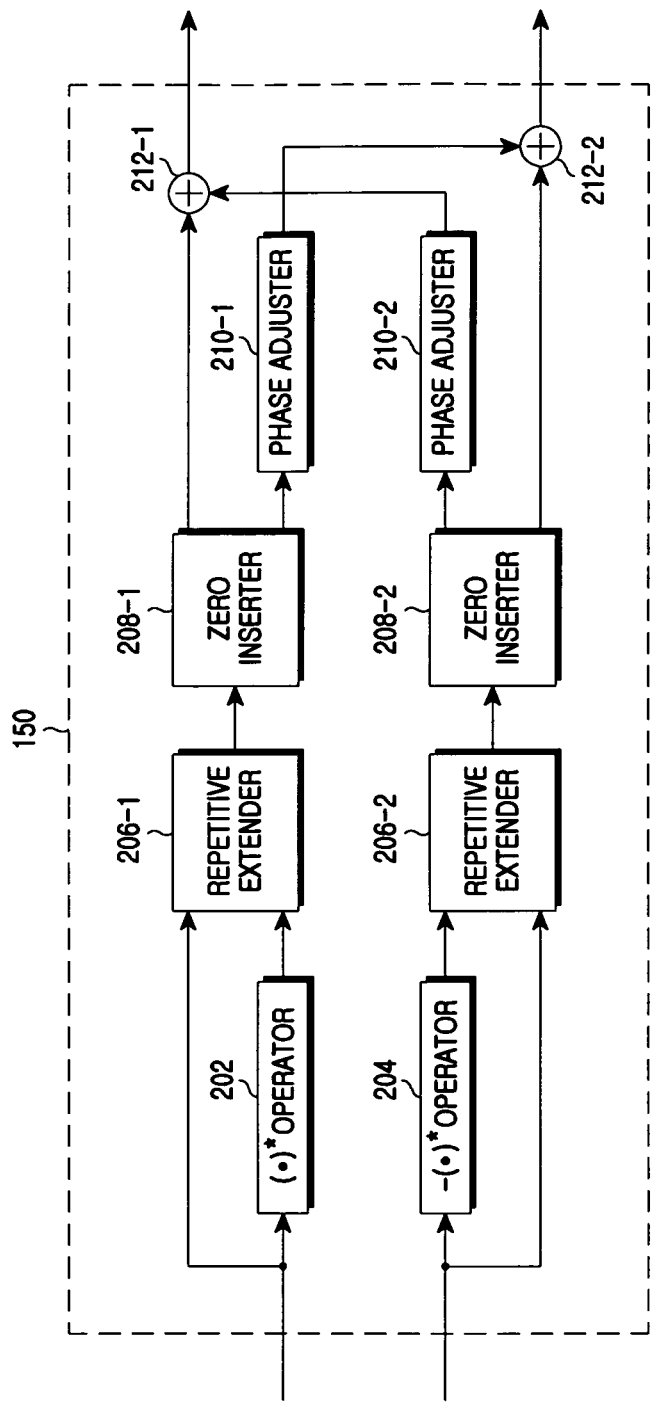
FIG. 2 is a block diagram of a space frequency block coder using an Alamouti code in a MIMO single carrier wireless communication system according to an exemplary embodiment of the present invention.
Figure 3:
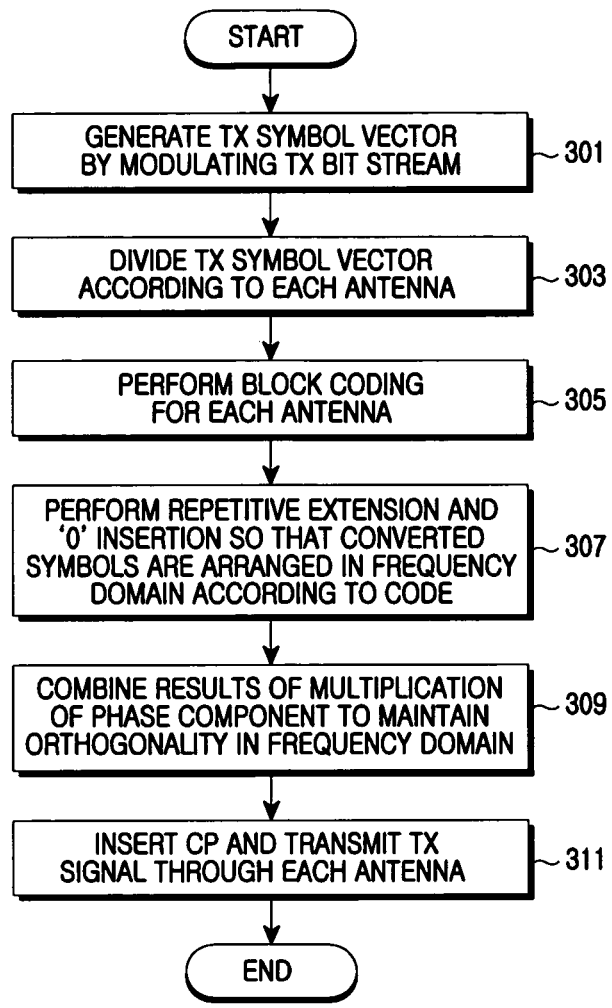
FIG. 3 is a flowchart illustrating a signal transmission process of a transmitting end in a MIMO single carrier wireless communication system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a technique for performing Space Frequency Block Coding (SFBC) in a Multiple Input Multiple Output (MIMO) single carrier wireless communication system will be described.

It will be assumed hereinafter that a transmitting end having two transmit (Tx) antennas uses an Alamouti code.

First, before the SFBC is performed, a Tx symbol vector for each antenna is expressed by Equation 1 below:

$$S_1 = [S_1(0), S_1(1), \ldots, S_1(N-1)]^T$$
$$S_2 = [S_2(0), S_2(1), \ldots, S_2(N-1)]^T. \quad \text{[Eqn. 1]}$$

In Equation 1, $S_k$ denotes a Tx symbol vector for an antenna k before the SFBC, and $S_k(n)$ denotes an $n^{th}$ Tx symbol for the antenna k before the SFBC.

When the SFBC is used according to the present invention, a result of a Fast Fourier Transform (FFT) operation on a receive (Rx) signal by a receiving end is expressed as Equation 2 below:

$$\begin{bmatrix} S_1(0) & S_2(0) \\ -S_2^*(0) & S_1^*(0) \\ S_1(1) & S_2(0) \\ -S_2^*(1) & S_1^*(1) \\ \vdots & \vdots \\ S_1(N-1) & S_2(N-1) \\ -S_2^*(N-1) & S_1^*(N-1) \end{bmatrix}. \quad \text{[Eqn. 2]}$$

In Equation 2, $S_k(n)$ denotes an $n^{th}$ value in a frequency-domain representation of a Tx symbol vector for the antenna k before the SFBC. Each column corresponds to each antenna, and each row corresponds to each subcarrier.

Regarding values for an antenna 1 (that is, regarding a first column in Equation 2 above), even index values are frequency-domain representations of Tx symbols for the antenna 1 before the SFBC, and odd index values have conjugate or code-conversion forms of frequency-domain representations of Tx symbols for an antenna 2 before the SFBC. In addition, regarding values for the antenna 2 (that is, regarding a second column in Equation 2 above), even index values are frequency-domain representations of the Tx symbols for the antenna 2 before the SFBC, and odd index values have conjugate forms of the frequency-domain representations of Tx symbols for the antenna 1 before the SFBC. To facilitate the following explanation, among the values for each antenna, the vectors composed of even index values will be referred to as 'even sub-vectors', and the vectors composed of odd index values will be referred to 'odd sub-vectors'.

The transmitting end of the present invention manipulates the time-domain symbols of Equation 1 above to have the frequency-domain representations of Equation 2 above. In this case, the transmitting end manipulates symbol vectors according to the following conversion relationship between the time domain and the frequency domain. First, repetition in the time domain implies insertion of '0' in the frequency domain. Second, as expressed by Equation 3 below, a conjugate form in the frequency domain is obtained by inverting a sign of an index in the time domain:

$$x^*(-n)_N \Leftrightarrow X^*(k), \text{ where } n,k=0,1,\ldots,N-1. \quad \text{[Eqn. 3]}$$

In Equation 3, $x^*(-n)_N$ denotes a conjugate of an $(-n)^{th}$ value in a time-domain signal composed of a total of N values. $X^*(k)$ denotes a conjugate of a $k^{th}$ value in a frequency-domain representation composed of N values.

According to the aforementioned relationship between the time-domain and the frequency-domain, the transmitting end performs repetitive extension on the symbol vector one time for each antenna as expressed by Equation 1 above. Thus, an even sub-vector is generated. Further, the transmitting end inserts '0' between symbols in the extended symbol vector and thus obtains a space time for adding an odd sub-vector. A time-domain signal vector corresponding to the even sub-vector can be expressed by Equation 4 below:

$$S_{k,even} = [S_k(0), 0, S_k(1), 0, \ldots, S_k(N-1), 0, S_k(1), 0, \ldots, S_k(N-1), 0]^T \quad \text{[Eqn. 4]}$$

In Equation 4, $S_{k,even}$ denotes a time-domain signal vector corresponding to an even sub-vector for the antenna k. $S_k(n)$ denotes an $n^{th}$ Tx symbol for the antenna k before the SFBC.

In addition, the transmitting end arranges the remaining symbols other than symbols having an index of '0' in the symbols included in each antenna symbol vector in a reverse order, and performs repetitive extension on the symbol vector one time, thereby generating the odd sub-vector. Further, the transmitting end inserts '0' between symbols in the extended symbol vector, and thus obtains a space time for adding an even sub-vector. As expressed by Equation 2 above (that is, according to a format of the Alamouti code), the odd sub-vector for the antenna 1 is code-converted. A time-domain signal vector corresponding to the odd sub-vector for each antenna can be expressed by Equation 5 below:

$$S_{1,odd} = [0, -S_2^*(0), 0, -S_2^*(N-1), \ldots, 0, -S_2^*(1), 0, -S_2^*(0), 0, -S_2^*(N-1), \ldots, 0, -S_2^*(1)]^T$$

$$S_{2,odd} = [0, S_1^*(0), 0, S_1^*(N-1), \ldots, 0, S_1^*(1), 0, S_1^*(0), 0, S_1^*(N-1), \ldots, 0, S_1^*(1)]^T. \quad \text{[Eqn. 5]}$$

In Equation 5, $S_{k,odd}$ denotes a time-domain signal vector corresponding to an odd sub-vector for the antenna k. $S_k(n)$ denotes an $n^{th}$ Tx symbol for the antenna k before the SFBC.

The even or odd sub-vector for each antenna generated by Equation 4 or 5 above is transmitted through each antenna. The odd sub-vector needs to be shifted along the frequency axis by one unit. Thus, the time-domain symbol vector corresponding to the odd sub-vector is multiplied by a phase adjustment component for a shift operation of Equation 6 below:

$$\Phi_{4N} = \text{diag}\left(1, e^{\frac{j2\pi}{4N}}, e^{\frac{j2\pi 2}{4N}}, \ldots, e^{\frac{j2\pi(4N-1)}{4N}}\right). \quad [\text{Eqn. 6}]$$

In Equation 6, $\Phi_{4N}$ denotes the phase adjustment component by which the odd sub-vector is shifted along the frequency axis by one unit. $\text{diag}(a_1, a_2, \ldots, a_M)$ denotes a diagonal matrix whose elements are $a_1$ to $a_M$. N denotes the number of Tx symbols for each antenna before the SFBC.

The time-domain symbol vector transmitted to each antenna can be expressed by Equation 7 below according to Equation 3 to Equation 6 above:

$$S_{k,SFBC} = (S_{k,even} + \Phi_{4N} S_{k,odd}). \quad [\text{Eqn. 7}]$$

In Equation 7, $S_{k,SFBC}$ denotes a time-domain symbol vector after the SFBC. $S_{k,even}$ denotes a time-domain signal vector corresponding to an even sub-vector for the antenna k. $\Phi_{4N}$ denotes the phase adjustment component by which the odd sub-vector is shifted along the frequency axis by one unit. $S_{k,odd}$ denotes a time-domain signal vector corresponding to an odd sub-vector for the antenna k.

The Tx signal of Equation 7 above is regulated so that its power satisfies the Tx power when transmitted. The regulated Tx signal can be expressed by Equation 8 below:

$$S_{k,SFBC,PowerControlled} = \sqrt{P_o/8N}(S_{k,even} + \Phi_{4N} S_{k,odd}). \quad [\text{Eqn. 8}]$$

In Equation 8, $S_{k,SFBC,PowerControlled}$ denotes a time-domain symbol vector after the SFBC. $P_0$ denotes total Tx power. N denotes the number of Tx symbols for each antenna before the SFBC. $S_{k,even}$ denotes a time-domain signal vector corresponding to an even sub-vector for the antenna k. $\Phi_{4N}$ denotes the phase adjustment component by which the odd sub-vector is shifted along the frequency axis by one unit. $S_{k,odd}$ denotes a time-domain signal vector corresponding to an odd sub-vector for the antenna k.

Hereinafter, a structure and operation of a transmitting end for performing SFBC according to the aforementioned method will be described in detail with reference to the accompanying drawings.

FIG. 1 is a block diagram of a transmitting end in a MIMO single carrier wireless communication system according to an exemplary embodiment of the present invention.

Referring to FIG. 1, the transmitting end includes a modulator 102, a de-multiplexer 104, a plurality of block coders 106-1 to 106-K, a plurality of repetitive extenders 108-1 to 108-K, a plurality of zero inserters 110-1 to 110-K, a signal combiner 112, a plurality of cyclic prefix (CP) inserters 114-1 to 114-K, and a plurality of radio frequency (RF) transmitters 116-1 to 116-K.

The modulator 102 modulates Tx data bit streams and converts them into complex symbols. The de-multiplexer 104 divides the complex symbols according to each antenna. That is, the de-multiplexer 104 configures a specific number of symbol vectors by using the complex symbols, wherein the specific number corresponds to the number of Tx antennas.

The plurality of block coders 106-1 to 106-K, the plurality of repetitive extenders 108-1 to 108-K, the plurality of zero inserters 110-1 to 110-K, and the signal combiner 112 constitute a space frequency block coder 150.

Each of the block coders 106-1 to 106-K converts symbols of each antenna according to a predetermined block coding code. A total of L outputs are obtained from the plurality of block coders 106-1 to 106-K. The number L varies depending on a format of the block coding code, and is in association with the number of symbols to be transmitted through one antenna after block coding is performed one time. For example, in case of using the Alamouti code, the number L is 2.

Each of the repetitive extenders 108-1 to 108-K collects the L block coded symbols during one Tx signal duration, and thereafter performs repetitive extension on the collected L symbol vectors along a time domain according to an arrangement required in a frequency domain. The one Tx signal duration denotes a time duration corresponding to an FFT operation size of the receiving end. If the FFT operation size is M, each of the repetitive extenders 108-1 to 108-K collects symbols provided a specific number of times, wherein the specific time is M/L. The arrangement required in the frequency domain representation varies depending on a format of the block coding code. For example, in case of using the Alamouti code, one unit of blank needs to be included between values of the frequency domain representation of each converted symbol vector.

Each of the zero inserters 110-1 to 110-K inserts '0' to the L extended symbol vectors in order to maintain a time-domain orthogonality between extended symbol vectors to be mutually combined by the signal combiner 112 (that is, in order to prevent the extended symbol vector to be mutually combined from overlapping in the same time unit). In this case, (L−1) '0's are inserted between symbols, and the number of '0's inserted in a first portion of each symbol vector differs from one vector to the next. For example, in case of using the Alamouti code, one '0' is inserted between symbols of the respective extended symbol vectors. A first portion of a symbol vector taking an original form is not inserted with '0'. A first portion of a symbol vector taking a conjugate form is inserted with '0'.

The signal combiner 112 combines the extended symbol vectors inserted with '0' according to the arrangement required in the frequency domain, and thus generates a Tx signal of each antenna. In this case, the signal combiner 112 multiplies a phase adjustment component by each symbol vector and then adds the multiplication results so that symbol vectors to be mutually combined are orthogonal in the frequency domain (that is, so that the symbol vectors are arranged to different frequency indices in the frequency domain). To satisfy the total Tx power, the signal combiner 112 regulates power of the Tx signal of each antenna.

Each of the CP inserters 114-1 to 114-K inserts a CP to the Tx signal of each antenna. Each of the RF transmitter 116-1 to 116-K up-converts a Tx signal, which includes the CP provided from its corresponding CP inserter 114, into an RF signal and then transmits the converted Tx signal through its corresponding antenna.

FIG. 2 is a block diagram of the space frequency block coder 150 using the Alamouti code in the MIMO single carrier wireless communication system according to an exemplary embodiment of the present invention.

Referring to FIG. 2, in case of using the Alamouti code, the space frequency block coder 150 includes a (·)* operator 202, a -(·)* operator 204, two repetitive extenders 206-1 and 206-2, two zero inserters 208-1 and 208-2, two phase adjusters 210-1 and 210-2, and two adders 212-1 and 212-2.

The (·)* operator 202 performs a conjugate operation on an input symbol. For example, if a symbol s is input, the (·)* operator 202 outputs s*. The -(·)* operator 204 performs a conjugate operation on an input symbol. For example, if the symbol s is input, the -(·)* operator 204 outputs −s*.

Each of the two repetitive extenders 206-1 and 206-2 collects symbols provided through two input nodes during one Tx signal duration, and thereafter performs repetitive extension on the symbol vectors provided through the respective input nodes one time in a time domain. In this case, for a symbol vector taking a conjugate form, each of the two repetitive extenders 206-1 and 206-2 arranges the remaining symbols other than the symbols having an index of '0' in a reverse order and performs repetitive extension on the symbol vector one time. For example, during the one Tx signal duration, if the repetitive extender 206-1 is provided with $[S_0, S_1, \ldots, S_{N-1}]$ through a first input node and $[S_0^*, S_1^*, \ldots, S_{N-1}^*]$ through a second input node, the repetitive extender 206-1 performs repetitive extension on each symbol vector to output $[S_0, S_1, \ldots, S_{N-1}, S_0, S_1, \ldots, S_{N-1}]$ and $[S_0^*, S_{N-1}^*, \ldots, S_1^*, S_0^*, S_{N-1}^*, S_{N-2}^*, \ldots S_1^*]$.

The two zero inserters 208-1 and 208-2 insert '0' to respective symbol vectors in order to maintain a time-domain orthogonality between symbol vectors added by the two adders 212-1 and 212-2 (that is, to ensure a time space for adding the symbol vectors). In a '0'-inserted symbol vector taking an original form and a '0'-inserted symbol vector taking a conjugate form, zeros are inserted in different positions. For example, if the zero inserter 208-1 is provided with $[S_0, S_1, \ldots, S_{N-1}, S_0, S_1, S_{N-1}]$ and $[S_0^*, S_{N-1}^*, \ldots, S_1^*, S_0^*, S_{N-1}^*, S_{N-2}^*, \ldots, S_1^*]$, the zero inserter 208-1 outputs $[S_0, 0, S_1, 0, \ldots, S_{N-1}, 0, S_0, 0, S_1, 0, \ldots, S_{N-1}, 0]$ and $[0, S_0^*, 0, S_{N-1}^*, \ldots, 0, S_1^*, 0, S_0^*, 0, S_{N-1}^*, 0, S_{N-2}^*, \ldots, S_1^*]$. That is, outputs of the zero inserter 208-1 corresponding to an antenna 1 are $S_{1,even}$ expressed in Equation 4 above and $S_{1,odd}$ expressed in Equation 5 above. Outputs of the zero inserter 208-2 corresponding to an antenna 2 are $S_{2,even}$ expressed in Equation 4 above and $S_{2,odd}$ expressed in Equation 5 above.

Each of the two phase adjusters 210-1 and 210-2 multiplies the symbol vector taking the conjugate form by a phase adjustment component so that the symbol vector taking the conjugate form and the symbol vector taking the original form are orthogonal in the frequency domain (that is, so that the symbol vector taking the conjugate form is shifted by one unit in the frequency domain). For example, the phase adjustment component is calculated by Equation 6 above. That is, outputs of the phase adjuster 210-1 corresponding to the antenna 1 are multiplications of $S_{1,odd}$ expressed in Equation 5 above and $\Phi_{4N}$ expressed in Equation 6 above. Outputs of the phase adjuster 210-2 corresponding to the antenna 2 are multiplications of $S_{2,odd}$ expressed in Equation 5 above and $\Phi_{4N}$ expressed in Equation 6 above.

Each of the two adders 212-1 and 212-2 adds the symbol vector taking the original form and the symbol vector taking the conjugate form, and thus generates the Tx signal for each antenna. In this case, as shown in FIG. 2, the adder 121-1 corresponding to the antenna 1 adds the symbol vector taking the original form and received from the zero inserter 208-1 corresponding to the antenna 1 and the symbol vector taking the conjugate form and received from the phase adjuster 210-2 corresponding to the antenna 2. The adder 212-2 corresponding to the antenna 2 adds the symbol vector taking the original form and received from the zero inserter 208-2 corresponding to the antenna 2 and the symbol vector taking the conjugate form and received from the phase adjuster 210-1 corresponding to the antenna 1. For example, the output of each of the two adders 212-1 and 212-2 is expressed by Equation 7 above. Further, each of the two adders 212-1 and 212-2 regulates the power of the Tx signal to satisfy a total Tx power. The power-regulated Tx signal for each antenna is expressed by Equation 8 above.

FIG. 3 is a flowchart illustrating a signal transmission process of a transmitting end in a MIMO single carrier wireless communication system according to an exemplary embodiment of the present invention.

Referring to FIG. 3, the transmitting end modulates Tx data bit streams to generate a Tx symbol vector in step 301.

After generating the Tx symbol vector, proceeding to step 303, the transmitting end divides the Tx symbol vector according to each antenna. That is, the transmitting end demultiplexes Tx symbols included in the Tx symbol vector generated in step 301. For example, the Tx symbol vector is divided according to each antenna as expressed by Equation 1 above.

After dividing the Tx symbol vector according to each antenna, proceeding to step 305, the transmitting end performs block coding for each antenna. In other words, the transmitting end performs block coding on the Tx symbols for each antenna according to a block coding code. For example, in the case of using the Alamouti code, the transmitting end generates a symbol vector taking an original form and a symbol vector taking a conjugate form with respect to symbols of an antenna 1, and also generates a symbol vector taking an original form and a symbol vector taking a conjugate form with respect to symbols of an antenna 2.

After performing the block coding, proceeding to step 307, the transmitting end performs repetitive extension and '0' insertion on symbols modified by the block coding, so that the block-coded symbols are arranged in a frequency domain according to a predetermined block coding code. For symbols taking a conjugate form in the frequency domain, the transmitting end arranges the remaining symbols other than the symbols having an index of '0' in a reverse order, and thereafter performs repetitive extension and '0' insertion. For example, in the case of using the Alamouti code, for the symbol vector taking the original form, the transmitting end performs repetitive extension one time and inserts '0' between symbols, whereas for the symbol vector taking the conjugate form, the transmitting end arranges the remaining symbols other than the symbols having an index of '0' in a reverse order, performs repetitive extension one time, and inserts '0' between symbols. In a '0'-inserted symbol vector taking an original form and a '0'-inserted symbol vector taking a conjugate form, zeros are inserted in different positions. For example, the repetitive-extended and '0'-inserted symbol vector is expressed by Equation 4 and Equation 5 above.

Proceeding to step 309, the transmitting end generates a Tx signal for each antenna by combining the repetitive-extended and '0'-inserted symbol vectors according to an arrangement required in the frequency domain (that is, according to the block coding code). In this case, the transmitting end multiplies a phase adjustment component by each symbol vector and then adds the multiplication results so that symbol vectors to be mutually combined are orthogonal in the frequency domain (that is, so that the symbol vectors are arranged to different frequency indices in the frequency domain). For example, in the case of using the Alamouti code, the transmitting end adds a symbol vector of an original form and corresponding to the antenna 1 and a symbol vector taking a conjugate form and corresponding to the antenna 2, and also adds a symbol vector taking an original form and corresponding to the antenna 2 and a symbol vector taking a conjugate form and corresponding to the antenna 1. In this case, the transmitting ends multiplies each symbol vector taking a conjugate form by the phase adjustment component of Equation 6 above, and thereafter adds the multiplication results. For example, the Tx signal is expressed by Equation 3 above. The power of the Tx signal is regulated to satisfy the total Tx power. The power-regulated Tx signal for each antenna is expressed by Equation 8 above.

After generating the Tx signal for each antenna, proceeding to step 311, the transmitting end inserts a CP to the Tx signal for each antenna. Thereafter, the transmitting end up-converts the Tx signal into an RF signal and then transmits the RF signal through each antenna.

According to exemplary embodiments of the present invention, Space-Frequency Block Coding (SFBC) is performed using time-domain repetition, zero insertion, and phase-shifted vector combination in a Multiple Input Multiple Output (MIMO) single carrier wireless communication system. Therefore, a block coding gain can be obtained while maintaining a Peak to Average Power Ratio (PAPR).

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmitting end apparatus in a Multiple Input Multiple Output (MIMO) single carrier wireless communication system, the apparatus comprising:
   a coder configured to perform block coding on symbols;
   an extender configured to collect the block-coded symbols during one transmit signal duration, arrange in a reverse order one or more remaining symbols other than symbols having an index of '0' for a symbol vector taking a conjugate form, and perform repetitive extension on the collected symbol vectors by an interval required in a frequency domain, wherein when the transmitting end uses an Alamouti code, the extender is configured to perform the repetitive extension on each symbol vector one time;
   an inserter configured to insert '0' to the repetitively extended symbol vectors so that the vectors are mutually orthogonal in a time domain; and
   a combiner configured to multiply the '0'-inserted symbol vectors by a phase component so that the vectors are mutually orthogonal in the frequency domain and thereafter combine the symbol vectors to generate a transmit (Tx) signal for each antenna, wherein the combiner is configured to regulate a power of the Tx signal for each antenna to satisfy a total Tx power.

2. The apparatus of claim 1, wherein the extender is configured to perform repetitive extension on the symbol vector a specific number of times corresponding to the interval required in the frequency domain.

3. The apparatus of claim 2, further comprising:
   a cyclic prefix (CP) inserter configured to insert a cyclic prefix to the Tx signal for each antennal; and
   a transmitter configured to transmit the CP-inserted Tx signal through each antenna.

4. The apparatus of claim 2, wherein the inserter is configured to insert '0' between symbols.

5. The apparatus of claim 4, wherein the inserter is configured to output symbol vectors expressed by:

$$s_{k,even}=[s_k(0),0,s_k(1),0,\ldots,s_k(N-1),0,s_k(0),0,s_k(1),0,\ldots,s_k(N-1),0]^T$$

$$s_{1,odd}=[0,-s_2^*(0),0,-s_2^*(N-1),\ldots,0,-s_2^*(1),0,-s_2^*(0),0,-s_2^*(N-1),\ldots,0,-s_2^*(1)]^T$$

$$s_{2,odd}=[0,s_1^*(0),0,s_1^*(N-1),\ldots,0,s_1^*(1),0,s_1^*(0),0,s_1^*(N-1),\ldots,0,s_1^*(1)]^T,$$

where $s_{k,even}$ denotes a time-domain signal vector corresponding to an even sub-vector for an antenna k, $S_{k,odd}$ denotes a time-domain signal vector corresponding to an odd sub-vector for the antenna k, and $s_k(n)$ denotes an $n^{th}$ Tx symbol for the antenna k before Space Frequency Block Coding (SFBC).

6. The apparatus of claim 5, wherein the combiner is configured to calculate the phase adjustment component according to:

$$\Phi_{4N} = \text{diag}\left(1, e^{\frac{j2\pi}{4N}}, e^{\frac{j2\pi 2}{4N}}, \ldots, e^{\frac{j2\pi(4N-1)}{4N}}\right),$$

where $\Phi_{4N}$ denotes the phase adjustment component by which the odd sub-vector is shifted along the frequency axis by one unit, $\text{diag}(a_1,a_2,\ldots,a_M)$ denotes a diagonal matrix whose elements are $a_1$ to $a_M$, and N denotes the number of Tx symbols for each antenna before the SFBC.

7. The apparatus of claim 6, wherein the combiner is configured to generate a Tx signal for each antenna according to:

$$s_{k,SFBC}=(s_{k,even}+\Phi_{4N}s_{k,odd}),$$

where $s_{k,SFBC}$ denotes a time-domain symbol vector after the SFBC, $S_{k,even}$ denotes a time-domain signal vector corresponding to an even sub-vector for the antenna k, $\Phi_{4N}$ denotes the phase adjustment component by which the odd sub-vector is shifted along the frequency axis by one unit, and $S_{k,odd}$ denotes a time-domain signal vector corresponding to an odd sub-vector for the antenna k.

8. The apparatus of claim 1, further comprising:
   a cyclic prefix (CP) inserter configured to insert a cyclic prefix to the Tx signal for each antennal; and
   a transmitter configured to transmit the CP-inserted Tx signal through each antenna.

9. The apparatus of claim 1, wherein the inserter is configured to insert '0' between symbols.

10. The apparatus of claim 1, wherein the inserter is configured to output symbol vectors expressed by:

$$s_{k,even}=[s_k(0),0,s_k(1),0,\ldots,s_k(N-1),0,s_k(0),0,s_k(1),0,\ldots,s_k(N-1),0]^T$$

$$s_{1,odd}=[0,-s_2^*(0),0,-s_2^*(N-1),\ldots,0,-s_2^*(1),0,-s_2^*(0),0,-s_2^*(N-1),\ldots,0,-s_2^*(1)]^T$$

$$s_{2,odd}=[0,s_1^*(0),0,s_1^*(N-1),\ldots,0,s_1^*(1),0,s_1^*(0),0,s_1^*(N-1),\ldots,0,s_1^*(1)]^T,$$

where $s_{k,even}$ denotes a time-domain signal vector corresponding to an even sub-vector for an antenna k, $s_{k,odd}$ denotes a time-domain signal vector corresponding to an odd sub-vector for the antenna k, and $s_k(n)$ denotes an $n^{th}$ Tx symbol for the antenna k before Space Frequency Block Coding (SFBC).

11. A method of transmitting a signal of a transmitting end in a Multiple Input Multiple Output (MIMO) single carrier wireless communication system, the method comprising:
- performing block coding on symbols;
- arranging in a reverse order one or more remaining symbols, other than symbols having an index of '0' for a symbol vector taking a conjugate form;
- collecting the block-coded symbols during one transmit (Tx) signal duration and performing repetitive extension on the collected symbol vectors by an interval required in a frequency domain, wherein the repetitive extension on each symbol vector is performed one time when the transmitting end uses an Alamouti code;
- inserting '0' to the repetitively extended symbol vectors so that the vectors are mutually orthogonal in a time domain;
- multiplying the '0'-inserted symbol vectors by a phase component so that the vectors are mutually orthogonal in the frequency domain and thereafter combining the symbol vectors to generate a transmit (Tx) signal for each antenna; and
- regulating a power of the Tx signal for each antenna to satisfy a total Tx power.

12. The method of claim 11, wherein repetitive extension is performed a specific number of times corresponding to the interval required in the frequency domain.

13. The method of claim 12, further comprising:
- inserting a cyclic prefix (CP) to the Tx signal for each antennal; and
- transmitting the CP-inserted Tx signal through each antenna.

14. The method of claim 12, wherein inserting '0' comprises inserting '0' between symbols.

15. The method of claim 14, wherein the '0'-inserted symbol vectors are expressed by:

$$s_{k,even} = [s_k(0), 0, s_k(1), 0, \ldots, s_k(N-1), 0, s_k(0), 0, s_k(1), 0, \ldots, s_k(N-1), 0]^T$$

$$s_{1,odd} = [0, -s_2^*(0), 0, -s_2^*(N-1), \ldots, 0, -s_2^*(1), 0, -s_2^*(0), 0, -s_2^*(N-1), \ldots, 0, -s_2^*(1)]^T$$

$$s_{2,odd} = [0, s_1^*(0), 0, s_1^*(N-1), \ldots, 0, s_1^*(1), 0, s_1^*(0), 0, s_1^*(N-1), \ldots, 0, s_1^*(1)]^T,$$

where $s_{k,even}$ denotes a time-domain signal vector corresponding to an even sub-vector for a antenna k, $s_{k,odd}$ denotes a time-domain signal vector corresponding to an odd sub-vector for the antenna k, and $s_k(n)$ denotes an $n^{th}$ Tx symbol for the antenna k before Space Frequency Block Coding (SFBC).

16. The method of claim 15, wherein the phase adjustment component is calculated according to:

$$\Phi_{4N} = \text{diag}\left(1, e^{\frac{j2\pi}{4N}}, e^{\frac{j2\pi 2}{4N}}, \ldots, e^{\frac{j2\pi(4N-1)}{4N}}\right),$$

where $\Phi_{4N}$ denotes the phase adjustment component by which the odd sub-vector is shifted along the frequency axis by one unit, $\text{diag}(a_1, a_2, \ldots, a_M)$ denotes a diagonal matrix whose elements are $a_1$ to $a_M$, and N denotes the number of Tx symbols for each antenna before the SFBC.

17. The method of claim 16, wherein a Tx signal for each antenna is generated according to:

$$s_{k,SFBC} = (s_{k,even} + \Phi_{4N} s_{k,odd}),$$

where $s_{k,SFBC}$ denotes a time-domain symbol vector after the SFBC, $s_{k,even}$ even denotes a time-domain signal vector corresponding to an even sub-vector for the antenna k, $\Phi_{4N}$ denotes the phase adjustment component by which the odd sub-vector is shifted along the frequency axis by one unit, and $s_{k,odd}$ denotes a time-domain signal vector corresponding to an odd sub-vector for the antenna k.

18. The method of claim 11, further comprising:
- inserting a cyclic prefix (CP) to the Tx signal for each antennal; and
- transmitting the CP-inserted Tx signal through each antenna.

19. The method of claim 11, wherein inserting '0' comprises inserting '0' between symbols.

20. The method of claim 11, wherein the '0'-inserted symbol vectors are expressed by:

$$s_{k,even} = [s_k(0), 0, s_k(1), 0, \ldots, s_k(N-1), 0, s_k(0), 0, s_k(1), 0, \ldots, s_k(N-1), 0]^T$$

$$s_{1,odd} = [0, -s_2^*(0), 0, -s_2^*(N-1), \ldots, 0, -s_2^*(1), 0, -s_2^*(0), 0, -s_2^*(N-1), \ldots, 0, -s_2^*(1)]^T$$

$$s_{2,odd} = [0, s_1^*(0), 0, s_1^*(N-1), \ldots, 0, s_1^*(1), 0, s_1^*(0), 0, s_1^*(N-1), \ldots, 0, s_1^*(1)]^T,$$

where $s_{k,even}$ denotes a time-domain signal vector corresponding to an even sub-vector for a antenna k, $s_{k,odd}$ denotes a time-domain signal vector corresponding to an odd sub-vector for the antenna k, and $s_k(n)$ denotes an $n^{th}$ Tx symbol for the antenna k before Space Frequency Block Coding (SFBC).

* * * * *